United States Patent
Iannizzotto et al.

(10) Patent No.: US 6,783,674 B2
(45) Date of Patent: Aug. 31, 2004

(54) NON-SKID STRAINER

(76) Inventors: Paul Iannizzotto, 2928 N. Myers St., Burbank, CA (US) 91504; Yvonne Iannizzotto, 2928 N. Myers St., Burbank, CA (US) 91504

( * ) Notice: Subject to any disclaimer, the term of this patent is extended or adjusted under 35 U.S.C. 154(b) by 0 days.

(21) Appl. No.: 09/940,081

(22) Filed: Jul. 31, 2002

(65) Prior Publication Data

US 2004/0035778 A1 Feb. 26, 2004

(51) Int. Cl.⁷ ............................................. B01D 29/00
(52) U.S. Cl. ..................... 210/250; 210/238; 210/470; 210/471; 210/495; 210/498
(58) Field of Search ................................ 210/249, 470, 210/471, 474, 238, 250, 495, 498; 248/94

(56) References Cited

U.S. PATENT DOCUMENTS

| | | | | |
|---|---|---|---|---|
| 3,960,733 A | * | 6/1976 | Van Dieren | 210/460 |
| 5,279,007 A | * | 1/1994 | Kolada | 4/639 |
| 6,039,887 A | * | 3/2000 | Licari | 210/800 |
| 6,508,368 B1 | * | 1/2003 | Arce, Jr. | 211/41.3 |

\* cited by examiner

*Primary Examiner*—Matthew O. Savage
(74) *Attorney, Agent, or Firm*—Paul Iannizzotto; Yvonne Iannizzotto; Jeffrey Di Toro

(57) ABSTRACT

A strainer for straining food is disclosed wherein. The strainer includes a clamping device for clamping the strainer to a center partition of a sink.

2 Claims, 2 Drawing Sheets

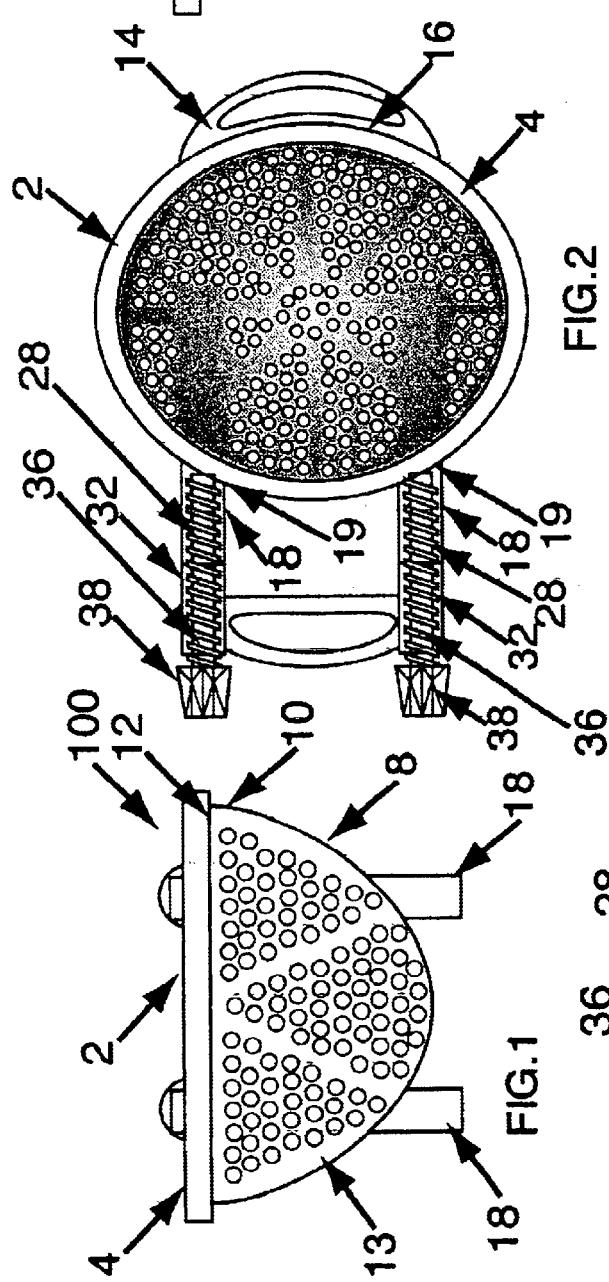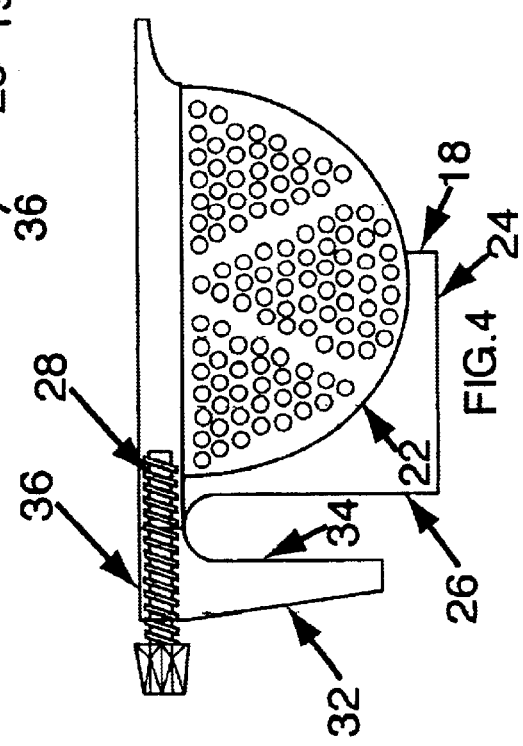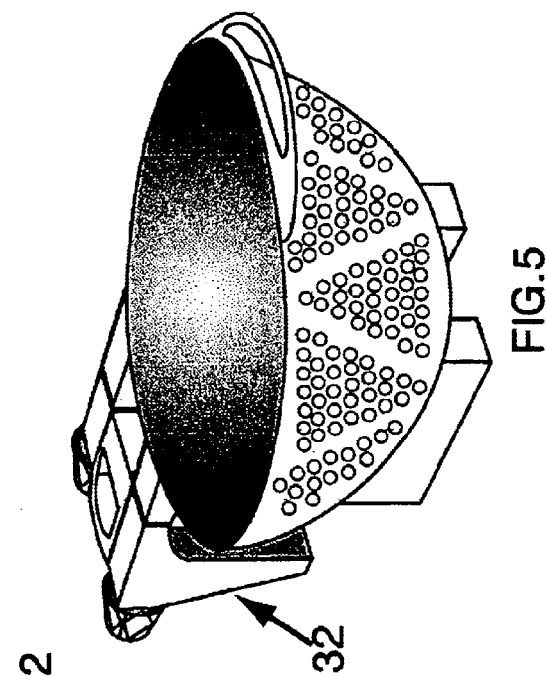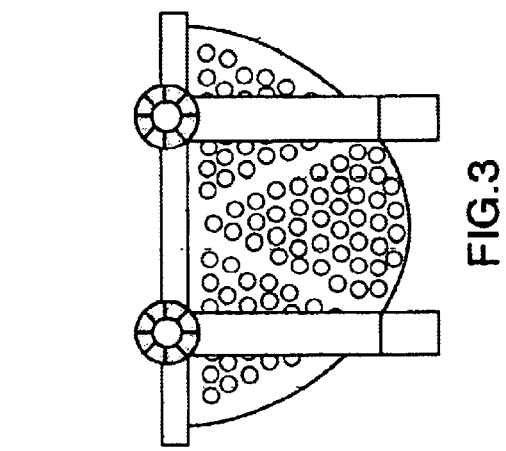

NON-SKID STRAINER

CROSS REFERENCE TO RELATED APPLICATIONS

None.

STATEMENT REGARDING FEDERALLY SPONSORED RESEARCH OR DEVELOPMENT

None.

REFERENCE TO A SEQUENCE LISTING, TABLE, OR COMPUTER PROGRAM LISTING SUBMITTED ON A COMPACT DISK

None.

BACKGROUND OF THE INVENTION

None.

BRIEF SUMMARY OF THE INVENTION

This invention relates to strainers for straining food.

BRIEF DESCRIPTION OF THE DRAWINGS

FIG. 1 shows a front view of the strainer;

FIG. 2 shows a top view of the strainer;

FIG. 3 shows a back view of the strainer;

FIG. 4 shows a side view of the strainer;

FIG. 5 shows a side perspective view of the strainer; and

DETAILED DESCRIPTION OF THE INVENTION

Figure 6:
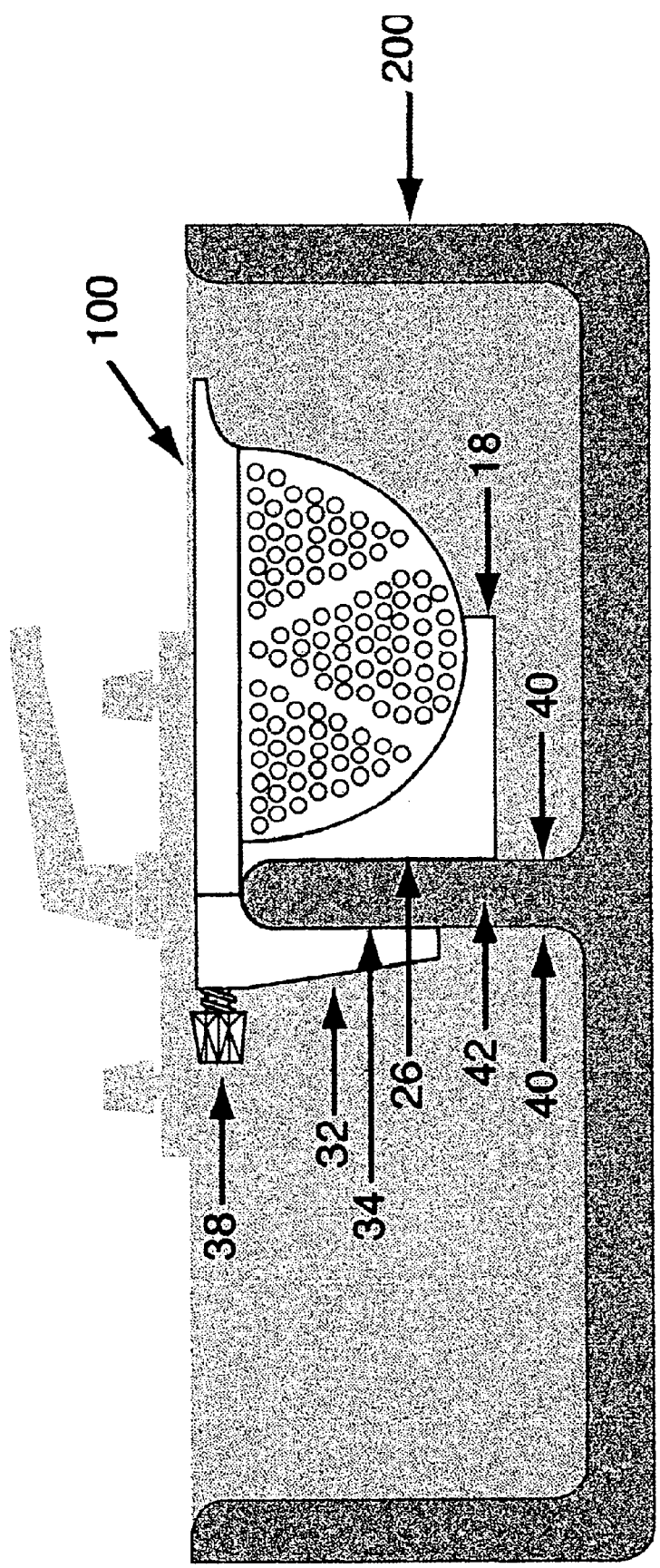
FIG. 6 shows the strainer mounted to the center partition of a sink.

As best shown in FIGS. 1–4, the strainer 100 includes a circular rim 2 having an upper side 4 and surrounding a central vertical axis 6. A bowl shaped strainer portion 8 having an upper peripheral edge 10 is connected to a lower side 12 of the circular rim 2 and a plurality of perforations 13 extend through the strainer portion 8. A first handle 14 is connected to an outer side portion 16 of the circular rim 8. The strainer includes first and second legs 18, wherein the first and second lens 18 are attached to an outer side portion 20 of the rim and an outer side surface 22 of said strainer portion B. The first and second legs 18 each having a bottom surface 24 positioned below the strainer portion 8 and aligned parallel to the upper side 4 of the circular rim 2 and a vertical side surface 26 that is perpendicular to the bottom surface 24 and that faces in a direction away from the strainer portion 8. First and second horizontal threaded bores 28 extend into an upper portion of the first and second legs 18, respectively. The first and second legs 18 extend from the outer side portion 19 of the rim 2 that is opposite the outer side portion 16 of the rim to the which the first handle 14 is connected. As shown in FIG. 1, the legs 18 are laterally offset from the central vertical axis 6 of the circular rim 8. The strainer includes second handle 30. First and second clamping parts 32 are attached to and extend downwardly from opposite sides of the second handle 30. The first and second clamping parts 32 each include a vertical side surface 34 that extends parallel to and faces toward the respective vertical side surface 26 of the first and second legs 18 and first and second horizontal bores 36 formed in an upper portion of each of the first and second clamping parts 32, respectively. As shown in FIG. 2, the horizontal bores 36 in the first and second clamping parts 32 are axially aligned with the respective horizontal threaded bores 28 in the first and second legs 18. First and second threaded fasteners 38 are received in the horizontal bores 36 of the first and second clamping parts 32 and in the horizontal threaded bores 28 of said first and second legs 18. The first and second fasteners 38 are adapted to bias the vertical side surfaces 34 of the first and second clamping parts 32 towards the vertical side surfaces 26 of the first and second legs 18. The rim 2, strainer portion 8, first handle 14, first and second legs 18, second handle 30, first and second clamping parts 32, and first and second threaded fasteners 38 are all formed of light-weight plastic that can be washed in a dishwasher. As shown in FIG. 6 the opposed vertical side surfaces 40 of the center partition 42 are clamped between vertical side surfaces 26 of the legs 18 and the vertical side surfaces 34 of the clamping parts 32 upon tightening of the first and second threaded fasteners 38 to clamp the strainer 100 to the center partition 42 of the sink 200.

What is claimed is:

1. A strainer adapted to be mounted to a center partition of a kitchen sink comprising:

a circular rim having an upper side and surrounding a central vertical axis;

a bowl shaped strainer portion having an upper peripheral edge connected to a lower side of said circular rim and a plurality of perforations extending through said strainer portion;

a first handle connected an outer side portion of said circular rim;

a first leg and a second leg, wherein said first and second legs are attached to an outer side portion of said rim and an outer side surface of said strainer portion, said first and second legs each having a bottom surface positioned below the strainer portion and aligned parallel to the upper side of said circular rim and a vertical side surface that is perpendicular to said bottom surface and that faces in a direction away from said strainer portion, and first and second horizontal threaded bores extending into an upper portion of said first and second legs, respectively, wherein said first and second legs extend from an outer side portion of said rim that is opposite the outer side portion of rim from the which said first handle is connected, wherein said legs are laterally offset from the central vertical axis of said circular rim;

a second handle;

first and second clamping parts attached to and extending downwardly from opposite sides of said second handle; wherein said first and second clamping parts each include a vertical side surface that extends parallel to and faces toward the respective vertical side surface of said first and second legs, and first and second horizontal bores formed in an upper portion of each of said first and second clamping parts, respectively, said horizontal bores in said first and second clamping parts being axially aligned with the respective horizontal threaded bores in the first and second legs; and first and second threaded fasteners received in the horizontal bores of said first and second clamping parts and in the horizontal threaded bores of said first and second legs, wherein said first and second fasteners are adapted to bias the vertical side surfaces of said first and second clamping parts towards the vertical side surfaces of said first and second legs;

whereby opposed vertical side surfaces of the center partition are clamped between vertical side surfaces of said legs and the vertical side surfaces of said clamping parts upon tightening of said first and second threaded fasteners to clamp said strainer to said center partition.

2. The strainer according to claim 1, wherein said rim, said strainer portion, said first handle, said first and second legs, said second handle, said first and second clamping parts, and said first and second threaded fasteners are all formed of light-weight plastic that can be washed in a dishwasher.

* * * * *